United States Patent
Zweering et al.

(10) Patent No.: US 6,663,959 B1
(45) Date of Patent: Dec. 16, 2003

(54) POLYURETHANE-UREA FIBRES WITH IMPROVED RESISTANCE

(75) Inventors: Uwe Zweering, Düsseldorf (DE); Thomas Gross, Wülfrath (DE); Stephan Hütte, Leverkusen (DE); Andreas Endesfelder, Overath (DE)

(73) Assignees: Bayer Aktiengesellschaft, Leverkusen (DE); Bayer Faser GmbH, Leverkusen (DE)

( * ) Notice: Subject to any disclaimer, the term of this patent is extended or adjusted under 35 U.S.C. 154(b) by 0 days.

(21) Appl. No.: 10/030,195

(22) PCT Filed: Jun. 26, 2000

(86) PCT No.: PCT/EP00/05887

§ 371 (c)(1),
(2), (4) Date: Apr. 24, 2002

(87) PCT Pub. No.: WO01/04202

PCT Pub. Date: Jan. 18, 2001

(30) Foreign Application Priority Data

Jul. 7, 1999  (DE) .......................................... 199 31 255

(51) Int. Cl.$^7$ .................................................. D01F 6/00
(52) U.S. Cl. ........................ 428/364; 428/397; 524/173
(58) Field of Search ................................ 428/364, 394; 524/173

(56) References Cited

U.S. PATENT DOCUMENTS 3,997,450 A   12/1976  Steinmiller .................. 252/8.7
6,329,452 B1 * 12/2001  Hutte .......................... 524/173

FOREIGN PATENT DOCUMENTS

EP   0 934 978 A1   8/1999   ........... C08L/75/04

OTHER PUBLICATIONS

Patent Abstracts of Japan, Publication No. 11–315202, Publication Date Nov. 16, 1999, Applicant: Bayer AG, Application No.: 11–027429, date of filing Feb. 4, 1999.

Abstract—Tose Y et al.: "Oily fluid containing sulfosuccinic acid or its salt for elastomer fiber", STN CAPLUS, XP002103421.

Abstract—Wakhara, Hiroyuki et al.: "Manufacture of smooth microporous grain synthetic leather with good mechanical strength", retrieved from STN Database accession No. 113:116799 CA XP002151082.

* cited by examiner

Primary Examiner—N. Edwards
(74) Attorney, Agent, or Firm—Norris McLaughlin & Marcus

(57) ABSTRACT

Polyurethane-urea compositions are described, and, in particular, elastic polyurethane-urea fibers are described which result therefrom and which contain a dialkylsulphosuccinate as a finely dispersed or dissolved additive which considerably increases the strength of the fibers. Moreover, a method is described of producing polyurethane-urea fibers using a dialkylsulphosuccinate as an additive.

12 Claims, No Drawings

POLYURETHANE-UREA FIBRES WITH IMPROVED RESISTANCE

This invention relates to polyurethane-urea compositions and relates in particular to elastic polyurethane-urea fibres which result therefrom and which contain a dialkylsulphosuccinate as an additive which considerably increases the strength of the fibres.

The expression "fibre" which is used in the context of the description of the present invention comprises staple fibres and continuous filaments which can be produced by spinning processes which are known in principle, such as the dry spinning process, the wet spinning process or the melt spinning process.

These spinning processes are described, for example, in Polyurethan-Elastomer-fasem, by H. Gall and M. Kausch, in the Kunststoff-Handbuch 7, Polyurethanes, edited by G. Oertel, Carl Hanser Verlag Munich, Vienna 1993, pages 679 to 694.

Elastic polyurethane-urea fibres are well known which comprise long chain synthetic polymers, at least 85% of which are synthesised from segmented polyurethanes based on polyethers, polyesters and/or polycarbonates for example. Yams from fibres such as these are used for the production of sheet goods or woven fabrics or materials which in turn, amongst their other uses, are suitable for corsetry, hosiery and sports clothing such as bathing costumes or bathing trunks, for example.

Polyurethane-urea fibres exhibit outstanding elasticity and a considerable stretching capacity in combination with high restoring forces. Due to this outstanding combination of properties, they are widely used in the clothing sphere. In order to a achieve a higher productivity during the processing of polyurethane-urea fibres, processing is effected at high speed and under considerable drawing forces. A high tensile strength of polyurethane-urea fibres is necessary in order to enhance the reliability of processing and to achieve a further increase in productivity.

Various methods of increasing the strength of polyurethane-urea fibres are described in the literature.

Thus, for example, the strength of polyurethane-urea fibres can be improved if, instead of using ethylenediamine, which is generally used, as the sole chain lengthener for lengthening the chain of the prepolymer during the preparation of the polyurethane-urea solution, a second diamine is also used as a co-lengthener (see U.S. Pat. No. 5,616,676, EP-692 039 B2 for example). The polyurethane-urea fibres which are thus obtained do in fact exhibit an improved strength, but due to the impairment of the hard segments caused by the co-lengthener they have an inferior thermal resistance, which is disadvantageous for the processing of the fibres.

Moreover, the maximum tensile elongation is considerably reduced by the use of co-extenders. This can result in an increased frequency of fibre breakage when fibres such as these are processed with hard fibres, cotton fibres and other fibres, for example.

Japanese Patent publications (Kokoku) JP 44-22113 and JP 45-109956 describe an improvement in polyurethane-urea spinning solutions which is achieved by the reaction of the prepolymer with a small amount of a monofunctional alcohol (JP 44-22113) or amine (JP 45-109956) before chain lengthening is effected. The effect of these measures on the strength of the fibres is only very slight, however.

European Patent Application EP 0 843 032 A1 describes polyurethane-urea fibres which are obtained from spinning solutions and to which salts of certain alkylsulphonates or alkylsulphates comprising long chain alkyl radicals are added. However, this patent application does not go into the possible negative effect of adding this reagent on the thermal resistance of the polyurethane-urea fibres. A further disadvantage is that the addition of salts such as these can result in inhomogeneous spinning solutions, since these salts may be difficultly soluble in polyurethane spinning solutions. This necessitates considerable expenditure when incorporating additives such as these in the spinning solution.

German Patent DE 44 34 300 A1 describes elastane fibres which exhibit an improved thermofixing capacity and which contain alkali metal salts of carboxylic acids as additives. However, it follows from the examples described that the effect on the strength of the elastane fibres is only a slight one.

The unpublished German Patent Application which has the Application Number 19805130.1 describes elastane fibres on which dialkylsulphosuccinates or salts thereof are deposited with a conditioning agent in order to prevent electrostatic charging of these materials during processing. The possibility of including additives in the spinning composition is in fact mentioned. However, there are no examples of fibres comprising finely dispersed or dissolved dialkylsulphosuccinates or salts thereof. Nothing is stated in this Application with regard to improving the (fineness-related) strength of elastane fibres by the incorporation of dialkylsulphosuccinates or salts thereof.

The object of the present invention is to provide polyurethane-urea fibres which do not have the aforementioned disadvantages of known polyurethane-urea fibres and which exhibit an improved (fineness-related) strength whilst at the same time exhibiting good maximum tensile elongation and good thermal resistance.

It has been found that the strength of polyurethane-urea fibres can be considerably increased by adding the salt of a dialkylsulphosuccinate to the polyurethane-urea composition before spinning. Surprisingly, this addition does not have a negative effect on the thermal stability of elastane fibres. Moreover, it has been found that it is possible to incorporate the additive in the polyurethane-urea composition without considerable expenditure, since the solubility of the dialkylsulphosuccinate salts which are used is outstanding, and homogeneous solutions are obtained.

The present invention relates to a polyurethane-urea composition having improved mechanical properties, characterised in that it comprises A) from 99.98 to 65% by weight, particularly from 99.95 to 80% by weight, most preferably from 99.9 to 85% by weight, of a polyurethane-urea polymer, B) from 0.02 to 15% by weight, particularly from 0.05 to 5% by weight, most preferably from 0.1 to 3% by weight, of a dialkylsulphosuccinate corresponding to general formula (1)

$$R_1OOC-CH-SO_3^-M^+ \\ | \\ R_2OOC-CH_2 \qquad (1),$$

wherein $R_1$ and $R_2$, independently of each other, are identical or different and represent an alkyl group comprising 5 to 10 carbon atoms, preferably an alkyl group comprising 8 carbon atoms, and are most preferably identical and represent 2-ethylhexyl radicals:

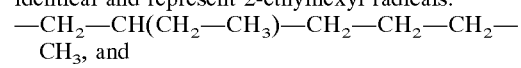

—$CH_2$—$CH(CH_2$—$CH_3)$—$CH_2$—$CH_2$—$CH_2$—$CH_3$, and $M^+$ is $Li^+$, $Na^+$, $K^+$ or $NH_4^+$, preferably $Na^+$, and C) from 0 to 20% by weight, particularly from 0 to 15% by weight, of additives.

By increasing the strength of the elastane fibres which contain the polyurethane-urea composition, the reliability of processing is increased and higher processing speeds become possible.

The polyurethane-urea compositions according to the invention contain segmented polyurethane-urea polymers. These polymers have a segmented structure, i.e. they contain "crystalline" and "amorphous" blocks (termed hard segments and soft segments, respectively).

In particular, the polyurethane-urea composition and the polyurethane-urea fibres can be produced from a linear homo- or copolymer which has a hydroxyl group at each end of its molecule and a molecular weight from 600 to 4000 g/mol, such as polyether diols, polyester diols, polyesteramide diols, polycarbonate diols, or from a mixture or from copolymers from this group. Furthermore, they are based on organic diisocyanates, with which the polymeric diols are reacted to form prepolymers comprising terminal isocyanate functions, and on diamines or mixtures of various diamines as chain lengtheners, with which the prepolymers which comprise terminal isocyanate functions are reacted to form high polymers.

Examples of organic diisocyanates include 4,4'-dicyclohexylmethane diisocyanate, isophorone diisocyanate and 4,4'-diphenylmethane diisocyanate. Examples of diamines include ethylenediamine, 1,2-propanediamine, 2-methyl-1,5-diaminopentane isophoronediamine, 1,3-diaminocyclohexane, 1-methyl-2,4-diaminocyclohexane and 1,2-diaminocyclohexane.

The polyurethane-urea polymers can be produced by methods which are known in principle, such as those which are described in patent specifications U.S. Pat. No. 2,929,804, U.S. Pat. No. 3,097,192, U.S. Pat. No. 3,428,711, U.S. Pat. No. 3,553,290 and U.S. Pat. No. 3,555,115, and in patent specification WO 9 309 174.

The polyurethane-urea fibres according to the invention can be used for the production of elastic woven fabrics, knitted fabrics, looped fabrics and other textile goods.

The present invention also relates to polyurethane-urea fibres which exhibit increased strength, and which are based on polyurethane-urea polymers which contain at least from 0.02 to 15% by weight, particularly from 0.05 to 5% by weight, most preferably from 0.1 to 3% by weight, of a dialkylsulphosuccinate corresponding to general formula (1)

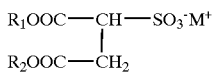  (1), wherein $R_1$ and $R_2$, independently of each other, are identical or different and represent an alkyl group comprising 5 to 10 carbon atoms, preferably an alkyl group comprising 8 carbon atoms, and are most preferably identical and represent 2-ethylhexyl radicals:
—$CH_2$—$CH(CH_2$—$CH_3)$—$CH_2$—$CH_2$—$CH_2$—$CH_3$, and $M^+$ is $Li^+$, $Na^+$, $K^+$ or $NH_4^+$, preferably $Na^+$,
wherein the dialkylsulphosuccinate is finely dispersed or dissolved in the fibre.

The present invention further relates to the use of dialkylsulphosuccinates corresponding to general formula (1)

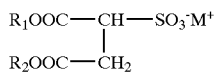  (1), wherein $R_1$ and $R_2$, independently of each other, are identical or different and represent an alkyl group comprising 1 to 30 carbon atoms, preferably an alkyl group comprising 4 to 18 carbon atoms, more preferably an alkyl group comprising 5 to 10 carbon atoms and most preferably an alkyl group comprising 8 carbon atoms, and $M^+$ is $Li^+$, $Na^+$, $K^+$ or $NH_4^+$, for increasing the (fineness-related) strength of polyurethane-urea fibres based on polyurethane-urea polymers, wherein the dialkylsulphosuccinate is finely dispersed or dissolved in the fibre in an amount from 0.02 to 15% by weight, particularly from 0.05 to 5% by weight, most preferably from 0.1 to 3% by weight.

Dialkylsulphosuccinates can be produced as described in the literature by C. R. Carly, Ind. Eng. Chem., Vol. 31, page 45, 1939.

Dialkylsulphosuccinates which are specially preferred include sodium diisobutylsulphosuccinate, sodium bis-(n-octyl)sulphosuccinate, sodium bis-(2-ethylhexyl)-sulphosuccinate, sodium dihexylsulphosuccinate, sodium diamylsulphosuccinate and sodium dicyclohexylsulphosuccinate.

Dialkylsulphosuccinates which are particularly preferred include sodium bis-(n-octyl)sulphosuccinate, sodium bis-(2-ethylhexyl)-sulphosuccinate and sodium dihexylsulphosuccinate.

Particular advantages are obtained with regard to fibre strength if a dialkylsulphosuccinate of formula (2) is used:

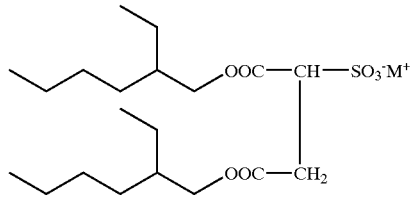  (2)

wherein $M^+$ represents $Li^+$, $Na^+$, $K^+$ or $NH_4^+$, preferably $Na^+$.

Sodium bis-(2-ethylhexyl)-sulphosuccinate is a dialkylsulphosuccinate which is quite particularly preferred.

The dialkylsulphosuccinates which are used for improving strength can be used as individual substances or as mixtures of a plurality of dialkylsulphosuccinates.

The dialkylsulphosuccinates can be added to the polyurethane-urea composition. e.g. during the production of polyurethane-urea fibres, at any point in the processing of the composition. For example, the dialkylsulphosuccinates can be added in the form of a solution to a solution, dispersion or slurry of other additives. During a processing operation to form fibres, they can then be mixed with the polymer solution or injected into the latter upstream of the fibre spinnerets. The dialkylsulphosuccinates can also of course be added separately, as a solution in a suitable medium, to the polymer (spinning) solution. Furthermore, the dialkylsulphosuccinates can be added in the aforementioned formulations during the customary production of polyurethane-urea.

For various purposes, the polyurethane-urea compositions according to the invention, or the polyurethane urea fibres which can be produced therefrom, can contain, as additives C), substances such as matting agents, fillers, antioxidants, dyes, pigments and mordants, and stabilisers against heat, light, and UV radiation, against water containing chlorine, and against vapours.

Examples of antioxidants and heat-, light- and UV radiation stabilisers are stabilisers from the group comprising sterically hindered phenols, HALS stabilisers (hindered amine light stabilisers), triazines, benzophenones and the benzotriazoles. Examples of pigments and matting agents include titanium dioxide, zinc oxide and barium sulphate. Examples of dyes include acidic dyes, dispersion- and pigment dyes and optical brighteners. Examples of stabilisers against degradation of the fibres by chlorine or by water which contains chlorine include zinc oxide, magnesium oxide or coated or uncoated magnesium aluminium hydroxycarbonates.

The present invention further relates to a method of producing improved polyurethane-urea fibres by the dry spinning or wet spinning process, preferably by the dry spinning process, by preparing the spinning solution, spinning the spinning solution using a spinneret, forming fibres downstream of the spinneret by removing the spinning solvent by drying or in a regeneration bath, and conditioning and taking up the fibres, characterised in that from 0.02 to 15% by weight, particularly from 0.05 to 5% by weight, most preferably from 0.1 to 3% by weight, of a dialkylsulphosuccinate corresponding to general formula (1)

(1), is admixed with and dissolved in the polyurethane-urea solution before said solution is spun to form polyurethane-urea fibres,
wherein
$R_1$ and $R_2$, independently of each other, are identical or different and represent an alkyl group comprising 5 to 10 carbon atoms, preferably an alkyl group comprising 8 carbon atoms, and are most preferably identical and represent 2-ethylhexyl radicals:
—$CH_2$—$CH(CH_2$—$CH_3)$—$CH_2$—$CH_2$—$CH_2$—$CH_3$, and
$M^+$ is $Li^+$, $Na^+$, $K^+$ or $NH_4^+$, preferably $Na^+$.

The invention is explained in more detail below by the examples, which do not constitute any limitation of the invention, however.

EXAMPLES

The polyurethane-urea solution which was used for the following examples and comparative examples was prepared by the following procedure:

A polyurethane spinning solution was prepared from a polyester diol contain polytetrahydrofuran (PTHF, e.g. Terathane 2000 manufactured by DuPont) with an average molecular weight of 2000 g/mol. The quoted molecular weight is the number average molecular weight. The diol was capped with methylene-bis(4-phenyl diisocyanate) (MDI, Bayer AG) in a molar ratio of 1 to 1.65 and was subsequently chain-lengthened with a mixture of ethylenediamine (EDA) and diethylamine (DEA), in a ratio by weight of 97:3, in dimethylacetamide. (The ratio of the amount of chain lengtheners and chain terminators to unreacted isocyanate in the prepolymer was 1.075 in all the examples).

The solids content of the resulting polyurethane-urea solution was 30%.

Thereafter, a master batch of additives was admixed with the polymers. This master batch consisted of 62.6% by weight dimethylacetamide (DMAC), 10.3% by weight Cyanox 1790 (1,3,5-tris(4-tert.-butyl-3-hydroxy-2,5-dimethylbenzyl)-1,3,5-triazine-2,4,6-(1H,3H,5H)-trione; manufactured by Cytec), 27.0% by weight of a 30% spinning solution and 0.001% by weight of the dye Makrolex-violett (manufactured by Bayer AG). This master batch was added to the polyurethane composition so that the content of Cyanox 1790 was 1.0% by weight with respect to the total solids content.

A second master batch was then admixed with this polyurethane composition. This second master batch consisted of 5.5% by weight Silwet L 7607 (a polyalkoxy-modified polydimethylsiloxane; viscosity: 50 mPas (at 25° C.), molecular weight 1000 g/mol; manufactured by OSI Specialties), 5.5% by weight magnesium stearate, 45.0 % by weight DMAC and 44.0% by weight of a 30% spinning solution, and was added so that the resulting magnesium stearate content was 0.25% by weight with respect to the solids content of the polyurethane-urea polymers.

The dialkylsulphosuccinate (as a homogeneous 30% by weight solution in dimethylacetamide) or another additive were added to this polyurethane composition in the amounts given below:

Example 1

0.3% by weight (with respect to the solids content of the polyurethane-urea solution) of sodium bis-(2-ethylhexyl) sulphosuccinate.

Example 2

0.5% by weight (with respect to the solids content of the polyurethane-urea solution) of sodium bis-(2-ethylhexyl) sulphosuccinate.

Comparative Example 1 (C1)

0.5% by weight (with respect to the solids content of the polyurethane-urea solution) of sodium acetate.

Comparative Example 2 (C2)

No additives added.

The final spinning solution was dry spun through spinnerets in a typical spinning apparatus for a dry spinning process to form filaments with a titre of 11 dtex, four filaments being combined in each case to form coalescing filamentary yarns. The fibre conditioning agent (Silicone Y 7769; manufactured by OSI Specialties) was deposited via a conditioning agent roller, 4% by weight being applied with respect to the weight of the polyurethane-urea fibres. The take-off speed of the thread coiler was 420 m/minute.

The mechanical and thermal properties of the filaments which were thus obtained were investigated and characterised. In this context, the fineness-related strength (FS) and maximum tensile elongation (MTE) were measured in particular, according to DIN 53834 Part 1. For this purpose, tensile tests were performed on the elastane filaments in a climatised state. The prepared test specimen was placed in a loop round the hook of the measuring head and around a 10 mm loop clamp with a prestressing force of 0.001 cN/dtex. The clamped length was 200 mm overall. A small vane of aluminium foil was accurately suspended at the height of a photoelectric barrier. The slide travelled at a velocity of deformation of 400%/minute (800 mm pull-off) until the thread broke, and returned to its starting position after the measurement. 20 measurements were made on each specimen. Furthermore, the heat distortion temperature (HDT) was determined using a thermomechanical analyser (TMA). This involved a determination of the elongation behaviour of an elastomer thread (100 mm) maintained under a slight pre-load (0.2 mg/dtex) as the temperature was continuously increased (20° C./min). Above a certain temperature (HDT) an elongation of the fibre occurred without a further rise in temperature. 45° tangents were drawn to the corresponding curves in order to determine the HDT. The higher was the resulting HDT, the more pronounced were the corresponding interactions between the hard segments. Table 1 shows the filament properties which were determined.

TABLE 1

Tabular comparison of thread data:

| Example no. | Titre dtex | FS cN/dtex | MTE % | HDT ° C. |
|---|---|---|---|---|
| 1 | 44.3 | 1.80 | 573 | 185 |
| 2 | 43.3 | 1.79 | 577 | 189 |
| C1 | 42.5 | 1.50 | 561 | 176 |
| C2 | 46.6 | 1.35 | 588 | 188 |

FS: fineness-related strength; MTE: maximum tensile elongation; HDT: heat distortion temperature.

As shown in these examples, the fineness-related strength (FS) was considerably increased by the addition of dialkylsulphosuccinate. The maximum tensile elongation (MTE) and thermal stability (HDT) remained at a high level.

When sodium acetate was added (C1), the fineness-related strength was increased considerably less than it was when dialkylsulphosuccinate was added. Moreover, the thermal stability (HDT) of the elastanes, which were provided with known additives, was impaired.

Example 3

The polyurethane composition described above was treated with 0.5% by weight of sodium bis-(2-ethyl-hexyl) sulphosuccinate (Aerosol OTS 100%; manufactured by Cytec). Sodium bis-(2-ethylhexyl)sulphosuccinate was incorporated in the polyurethane-urea solution by stirring sodium bis-(2-ethylhexyl)sulphosuccinate, as a homogeneous 30% solution in dimethylacetamide (DMAC), into the polyurethane-urea solution.

The spinning solution obtained was spun through spinnerets by the dry spinning process, in a typical spinning apparatus for a dry spinning process, to form filaments with a titre of 22 dtex, two individual filaments being combined in each case to form coalescing filament yarns. The silicone oil-based fibre conditioning agent was deposited via a conditioning agent roller in an amount of 4% with respect to the weight of the fibres. The take-up speed of the fibres was 930 m/minute.

In comparative example 3 (C3) the spinning solution described above was spun without the addition of sodium bis-(2-ethylhexyl)sulphosuccinate, under conditions which were otherwise the same.

The mechanical properties of the filaments obtained are compared in Table 2.

TABLE 2

Comparison of fibre properties at a take-up speed of 930 m/min.

| Example | Titre (dtex) | FS (cN/dtex) | MTE (%) |
|---|---|---|---|
| 3 | 44 | 1.67 | 548 |
| C3 | 44 | 1.37 | 546 |

FS: fineness-related strength; MTE: maximum tensile elongation

As shown by a comparison of the above examples, even at a high take-up speed of 930 m/min the fineness-related strength (FS) was considerably improved by the addition of sodium bis-(2-ethylhexyl)sulphosuccinate. The maximum tensile elongation (MTE) was not impaired by the addition of sodium bis-(2-ethylhexyl)sulphosuccinate and remained constant at a high level.

What is claimed is:

1. A polyurethane-urea composition having improved mechanical properties, comprising
    A) from 99.98 to 65% by weight of a polyurethane-urea polymer,
    B) from 0.02 to 15% by weight, of a dialkylsulphosuccinate corresponding to general formula (2)

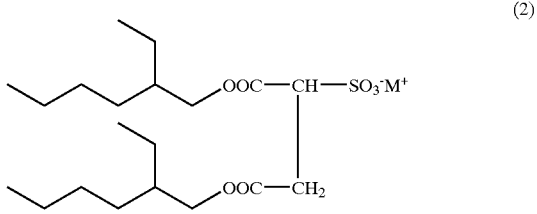

(2)

wherein $M^+$ represents Li+, Na+, K+ or $NH_4+$,
and
    C) from 0 to 20% by weight of additives.

2. A polyurethane-urea composition according to claim 1 wherein the dialkylsulphosuccinate is the sodium salt of sulphosuccinic acid bis-(2-ethylhexyl)ester corresponding to formula (2).

3. Polyurethane-urea fibers which exhibit increased fineness-related strength, comprising polyurethane-urea polymers which contain from 0.02 to 15% by weight of a dialkylsulphosuccinate corresponding to general formula (2)

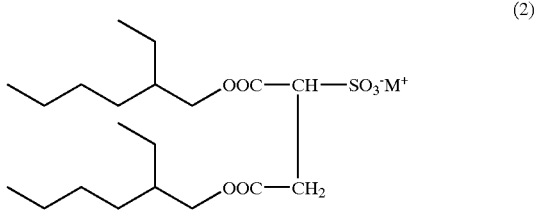

(2)

wherein M+ represents Li+, Na+, K+ or $NH_4+$,
    and wherein the dialkylsulphosuccinate is finely dispersed or dissolved in the fiber.

4. Polyurethane-urea fibers according to claim 3, wherein the dialkylsulphosuccinate is the sodium salt of sulphosuccinic acid bis-(2-ethylhexyl)ester corresponding to formula (2).

5. A method for increasing the strength of polyurethane urea fibers comprising polyurethane-urea polymers, which comprises dispersing a dialkylsulphosuccinate of formula 2

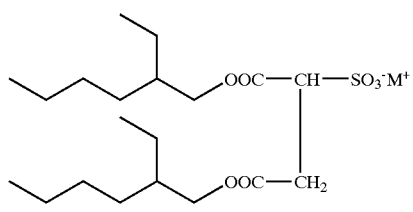

(2)

wherein M+ represents Li+, Na+, K+ or NH$_4$+ in the fiber in an amount from 0.02 to 15% by weight.

6. Method according to claim 5, wherein the dialkylsulphosuccinate is the sodium salt of sulphosuccinic acid bis-(2-ethylhexyl)ester corresponding to formula (2).

7. A method of producing improved polyurethane-urea fibers by the dry spinning or wet spinning process which comprises preparing the spinning solution, spinning the spinning solution using a spinneret, forming fibers downstream of the spinneret by removing the spinning solvent by drying or in a regeneration bath, and conditioning and taking up the fibers, wherein from 0.02 to 15% by weight of a dialkylsulphosuccinate corresponding to general formula (2)

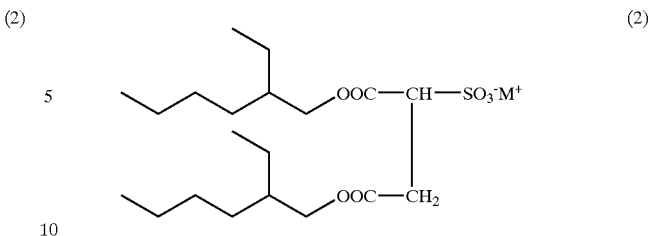

(2)

wherein M+ represents Li+, Na+, K+ or NH$_4$+, is admixed with and dissolved in the polyurethane-urea solution before said solution is spun to form polyurethane-urea fibres.

8. A method according to claim 7, wherein the dialkylsulphosuccinate is the sodium salt of sulphosuccinic acid bis(2-ethylhexyl)ester corresponding to formula (2).

9. Elastic woven fabrics, knitted fabrics or looped fabrics comprising he polyurethane-urea fibers of claim 3.

10. The polyurethane-urea composition of claim 1, wherein M$^+$ represents Na$^+$.

11. The polyurethane-urea fibers of claim 3, wherein M$^+$ represents Na$^+$.

12. The method of claim 7, wherein M$^+$ represents Na$^+$.

* * * * *

UNITED STATES PATENT AND TRADEMARK OFFICE
CERTIFICATE OF CORRECTION

PATENT NO.     : 6,663,959 B1
DATED          : December 16, 2003
INVENTOR(S)    : Zweering et al.

It is certified that error appears in the above-identified patent and that said Letters Patent is hereby corrected as shown below:

<u>Column 10,</u>
Line 20, "comprising he" should read -- comprising the --.

Signed and Sealed this

Sixth Day of July, 2004

JON W. DUDAS
*Acting Director of the United States Patent and Trademark Office*